United States Patent [19]

Koundakjian

[11] 3,865,937

[45] Feb. 11, 1975

[54] DRY STABLE PHOSPHOROTHIOATE INSECTICIDE FORMULATIONS

[75] Inventor: Theodore H. Koundakjian, Berkeley, Calif.

[73] Assignee: Chevron Research Company, San Francisco, Calif.

[22] Filed: Mar. 1, 1966

[21] Appl. No.: 530,775

[52] U.S. Cl. ............................................. 424/218
[51] Int. Cl. ............................................. A01n 9/36
[58] Field of Search ........ 167/42 S, 42 C, ; 252/352, 252/106; 424/218; 260/954

[56] References Cited
UNITED STATES PATENTS

| | | | |
|---|---|---|---|
| 2,776,237 | 1/1957 | Clark et al. | 167/22 |
| 2,954,396 | 9/1960 | Ayers et al. | 260/482 |
| 3,062,709 | 11/1962 | Ordas | 167/30 |
| 3,244,502 | 4/1966 | Woogerd | 167/42 |
| 3,278,369 | 10/1966 | Haering | 167/22 |

OTHER PUBLICATIONS

Chemical Abstracts, Vol. 60, 1964, p. 7384c and pp. 1824–1825S.

Primary Examiner—Jerome D. Goldberg
Attorney, Agent, or Firm—G. F. Magdeburger; John Stoner, Jr.; Dix A. Newell

[57] ABSTRACT

Stable dry insecticide formulations comprising an O,O-dialkyl-O-p-nitrophenyl phosphorothioate wherein the alkyl groups are the same and each contains one to two carbon atoms, an adsorbent clay carrier and a stabilizing amount of ethylacetoacetate or polyoxyalkylene partial ester of phosphoric acid wherein the alkylene groups contain two to three carbon atoms and the number of alkylene groups in the polyoxyalkylene moiety is about 2 to 70.

6 Claims, No Drawings

DRY STABLE PHOSPHOROTHIOATE INSECTICIDE FORMULATIONS

This invention concerns stable dry organic phosphate insecticide compositions. More particularly, it relates to solid formulations of O,O-dialkyl-O-p-nitrophenyl phosphorothioate stabilized with weak aliphatic carboxylic acids, ethylacetoacetate or polyoxyalkylene partial esters of phosphoric acid.

O,O-dialkyl-O-p-nitrophenyl phosphorothioates wherein the alkyl groups are the same and each contains one to two carbon atoms (known as parathion and methylparathion) are commonly formulated as dry compositions. These solid compositions may be dusts, powders or granules which comprise a toxic amount of the phosphorothioate intimately admixed with a solid carrier. The carrier is normally an adsorbent clay such as an attapulgite, kaolin, sepiolite, montmorillonite or other bentonite.

Solid formulations of methylparathion or parathion and such clays are known to be unstable. Interaction between the toxicant and clay apparently causes the toxicant to breakdown or otherwise change. Over prolonged storage periods — which are common for solid pesticide formulations — this interaction may reduce the effectiveness of the toxicant. Consequently, the shelf-lives of parathion or methylparathion-clay formulations are limited. And, if the toxic content falls below the guaranteed level, the formulation becomes unsaleable. So it must either be replaced or, if possible, fortified.

If has now been found that dry formulations of parathion or methylparathion and such clay are stabilized by adding aliphatic carboxylic acids having a $pK_a$ of at least about 4, ethylacetoacetate or polyoxyalkylene partial esters of phosphoric acid to the formulation.

The carboxylic acids used in this invention are aliphatic monocarboxylic acids which may be olefinically unsaturated or saturated. The $pK_a$'s of these acids are at least about 4 and more usually between about 4 and 6. They may contain two to about 18 carbon atoms. Examples of such carboxylic acids are acetic, propionic, valeric, caprylic, undecanoic, lauric, myristic, stearic, oleic, linoleic and the like. Acetic acid is preferred.

In the polyoxyalkylene partial esters of phosphoric acid of this invention the alkylene groups contain two to three carbon atoms, i.e., ethylene and propylene. The number of alkylene groups in the polyoxyalkylene moiety will usually be 2 to about 70, more usually 4 to 24. These partial esters are usually mixtures of monopolyoxyalkylene phosphates and dipolyoxyalkylene phosphates. Structurally, they may be represented by the following general formulae:

(1) 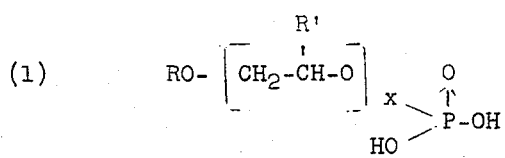

(2) 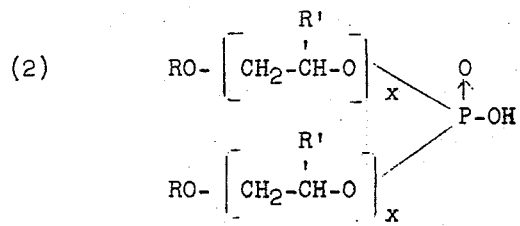

wherein R' is hydrogen or a methyl group, $x$ is an integer from 2 to about 70, more usually from 4 to 24 and R is an aliphatic or aromatic hydrocarbyl group having about seven to 40 carbon atoms. Typical R groups are dodecyl, tridecyl, tetradecyl, hexadecyl, octadecyl, octylphenyl, nonylphenyl, dodecylphenyl, dinonylphenyl, hexadecylphenyl, ditetradecylphenyl, dihexadecylphenyl, oleyl, linoleyl, etc.

These mixtures of polyoxyalkylene acid phosphates are the reaction products of phosphorus pentoxide or phosphorus oxychloride with polyoxyalkylene etheralcohols of fatty alcohols or alkyl phenols. Since these mixtures are reaction products, the relative proportions of mono-and diester will fluctuate depending upon the reaction conditions. Usually the reaction product will contain about 65 to 80 weight per cent monoester and about 20 to 35 weight per cent diester. If equilibrium is achieved, the reaction product will normally contain 69 to 71 weight per cent monoester and 24 to 26 weight per cent diester.

The solid insecticidal formulations of this invention comprise a toxic amount of parathion or methylparathion intimately admixed with adsorbent clay and a sufficient amount of one or more of the stabilizers of this invention to stabilize the formulation. The stabilizer will normally comprise about 0.3 to 2.0 weight per cent of the formulation, preferably about 0.8 to 1.2 weight per cent. The amount of toxicant in the formulation may vary widely between about 1 and 80 weight per cent depending upon the particular formulation. Wettable powders usually contain 15 to 80 weight per cent toxicant, more usually 50 to 80 weight per cent. Typically granular formulations will contain 2 to 30 weight per cent phosphorothioate, preferably 10 to 20 weight per cent. In comparison, dusts typically contain 1 to about 10 weight per cent toxicant, preferably 3 to 6 weight per cent.

The toxicant and stabilizer may be mixed with the clay separately or jointly by any known means. Desirably, they are sprayed on the clay as small droplets, such as with an atomizer.

Aside from the phosphorothioate, clay and stabilizer, these formulations may also contain compatible pesticides such as aldrin and heptachlor. Wettable powders will usually contain a surface active agent. They may also contain fillers, adjuvants and the like.

The following examples illustrate the compositions of this invention. Unless otherwise indicated, all proportions are by weight. Reproducibility of the gas-liquid chromatography analyses used herein is approximately ± 5%.

EXAMPLE 1

A stock solution of 5.0 g. glacial acetic acid in 50.7 g. parathion was prepared in a vessel. 28 g. of this solution was sprayed on 250 g. attapulgite granules (Attaclay AA RVM 15/30 with an atomizer. The granules were mixed thoroughly during the spraying. A sample of these granules was extracted in acetone and analyzed by gas-liquid chromotography (GLC). The granules were found to contain 8.32% parathion. The granules were then divided into two parts and placed into brown glass bottles. One part was stored at ambient temperature while the other was stored in a 100° F. oven. Each part was analyzed by GLC at various periods. The results of these analyses expressed as per cent parathion in the granules were as follows:

| Ambient Temp. | | 100°F. | |
|---|---|---|---|
| Days | % | Days | % |
| 4 | 8.32 | 7 | 8.56 |
| 11 | 8.5 | 21 | 8.16 |
| 25 | 8.08 | 35 | 8.58 |
| 40 | 8.38 | 72 | 8.23 |
| 77 | 8.64 | 101 | 8.04 |
| 106 | 8.18 | | |

The procedure of Example 1 was repeated using other stabilizers of this invention in place of glacial acetic acid. The storage tests results at ambient temperature and 100°F. are tabulated below.

TABLE I

| | | % parathion before storage | Ambient Temperature | | | | | | 100°F. | | | | |
|---|---|---|---|---|---|---|---|---|---|---|---|---|---|
| | | | Days | | | | | | Days | | | | |
| Ex. | Stabilizer | | 4 | 11 | 25 | 40 | 77 | 106 | 7 | 21 | 35 | 72 | 101 |
| 2 | ethylacetoacetate | 8.05 | 8.05 | 8.00 | 7.76 | 8.19 | 7.85 | 8.26 | 7.89 | 7.56 | 8.09 | 7.85 | 7.90 |
| 3 | oleic acid | 8.33 | 8.33 | 8.39 | 7.79 | 8.12 | 8.39 | 7.96 | 8.23 | 7.82 | 8.10 | 7.97 | 8.06 |
| 4 | Polyoxyethylene partial ester of phosphoric acid. *R contains 13 carbon atoms, x = 15, wt. ratio of mono- to diester ~ 70/25 | 8.08 | 8.08 | 7.87 | 8.10 | 7.77 | 7.99 | 7.89 | 8.14 | 8.05 | 7.68 | 7.56 | 7.59 |

*Refer to formulae 1 and 2

As will be evident to those skilled in the art, various modifications on this invention can be made or followed, in the light of the foregoing disclosure and discussion, without departing from the spirit or scope of the disclosure or from the scope of the following claims.

I claim:

1. A stable dry insecticidal formulation comprising a toxic amount of O,O-dialkyl-O-p-nitrophenyl phosphorothioate wherein the alkyl groups are the same and each contains one to two carbon atoms, adsorbent clay carrier and a sufficient amount of ethylacetoacetate or a mixture of (1) 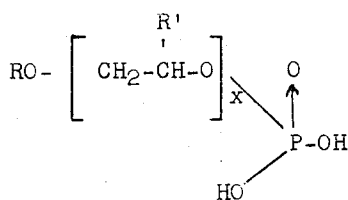

(2)

$$RO-\left[CH_2-CH-O\right]_x \diagdown \atop RO-\left[CH_2-CH-O\right]_x \diagup P-OH \quad \text{and}$$

wherein R' is hydrogen or methyl, R is an aliphatic or aromatic hydrocarbyl group of about 7 to 40 carbon atoms and x is an integer from 4 to 24, said mixture comprising about 65 to 80% by weight (1) and about 20 to 35% by weight (2) to stabilize the formulation.

2. The formulation of claim 1 wherein the O,O-dialkyl-O-p-nitrophenyl phosphorothioate is O,O-diethyl-O-p-nitrophenyl phosphorothioate.

3. The formulation of claim 1 wherein the O,O-dialkyl-O-p-nitrophenyl phosphorothioate comprises about 1 to 80 weight per cent of the formulation and the ethylacetoacetate or the mixture of (1) and (2) comprises about 0.3 to 2.0 weight per cent of the formulation.

4. The formulation of claim 1 wherein the number of alkylene groups in the polyoxyalkylene moiety of the partial ester is 4 to 24.

5. The formulation of claim 1 wherein said adsorbent clay is attapulgite.

6. The formulation of claim 1 wherein said formulation is granular and the amount of O,O-dialkyl-O-p-nitrophenyl phosphorothioate is 2 to 30 weight per cent of the formulation.

* * * * *